United States Patent [19]

Koch et al.

[11] Patent Number: 5,595,050
[45] Date of Patent: Jan. 21, 1997

[54] METHOD OF MAKING POLYETHYLENE STRETCH FILMS AND UNITIZED PALLETS

[75] Inventors: Kaelyn C. Koch, Lake Jackson, Tex.; Lisa M. Bolek, Midland, Mich.

[73] Assignee: The Dow Chemical Company, Midland, Mich.

[21] Appl. No.: 405,666

[22] Filed: Mar. 17, 1995

Related U.S. Application Data

[62] Division of Ser. No. 962,772, Oct. 19, 1992, Pat. No. 5,399,426.

[51] Int. Cl.$^6$ ..................................................... B65B 53/00
[52] U.S. Cl. ............................................. 53/441; 53/140
[58] Field of Search ................................. 53/140, 441, 556

[56] References Cited

U.S. PATENT DOCUMENTS

| | | |
|---|---|---|
| 3,176,052 | 3/1965 | Peticolas . |
| 4,339,507 | 7/1982 | Kurtz et al. . |
| 4,367,256 | 1/1983 | Biel . |
| 4,399,180 | 8/1983 | Briggs et al. . |
| 4,418,114 | 11/1983 | Briggs et al. . |
| 4,436,788 | 3/1984 | Cooper . |
| 4,504,434 | 3/1985 | Cooper . |
| 4,518,654 | 5/1985 | Eichbauer et al. . |
| 4,542,188 | 9/1985 | van der Heijden . |
| 4,560,580 | 12/1985 | Needham et al. ................... 53/441 X |
| 4,588,650 | 5/1986 | Mientus et al. . |
| 4,664,866 | 5/1987 | van der Heijden . |
| 4,833,017 | 5/1989 | Benoit ................... 53/441 X |
| 4,842,922 | 6/1989 | Krupp et al. . |
| 4,863,769 | 9/1989 | Lustig et al. . |
| 4,905,448 | 3/1990 | Plitt ................... 53/441 X |
| 4,943,780 | 7/1990 | Redding . |
| 4,976,898 | 12/1990 | Lustig et al. . |
| 5,019,315 | 5/1991 | Wilson . |
| 5,431,284 | 7/1995 | Wilson ................... 53/441 X |

FOREIGN PATENT DOCUMENTS

| | | |
|---|---|---|
| 1157216 | 11/1983 | Canada . |
| 1189218 | 6/1985 | Canada . |
| 0404368A2 | 12/1990 | European Pat. Off. . |
| 2128199 | 4/1984 | United Kingdom . |

OTHER PUBLICATIONS

Copending application Ser. No. 07/719,228 (Atty. Docket No. C-39,162) filed Jun. 21, 1991 by M. B. Biddle, et al., titled "Polyethylene Blends for Molding".

*Primary Examiner*—Linda Johnson

[57] ABSTRACT

The invention disclosed herein relates to a method of making a monolayer or multilayer film structure as well as to a method of making a unitized pallet of goods wherein the pallet is stretched wrapped with the film structure. The film structure in each method comprises a polymer blend which contains at least one branched polymer (e.g. low density polyethylene (LDPE) or ethylene/vinyl acetate copolymer (EVA) and at least one linear polyethylene (e.g., LLDPE). The film structure is characterized as having a good overall balance of properties, including high ultimate elongation, excellent load retention and good machine direction tear.

12 Claims, 1 Drawing Sheet

METHOD OF MAKING POLYETHYLENE STRETCH FILMS AND UNITIZED PALLETS

CROSS-REFERENCE TO RELATED APPLICATION

This is a divisional of application Ser. No. 07/962,772 filed Oct. 19, 1992 now U.S. Pat. No. 5,399,426.

FIELD OF THE INVENTION

This invention relates to films made from blends of linear low density polyethylene and a minor amount of at least one branched polymer selected from the group consisting of ethylene homopolymers (e.g., high pressure low density polyethylene) and ethylene/vinyl acetate copolymers. The films have high elongation, excellent load retention and good tear resistance.

BACKGROUND OF THE INVENTION

Thermoplastic stretch wrap films are commonly used to unitize pallet loads of goods during shipment and storage. Optimally, the films should have good stretch performance (high ultimate elongation), low relaxation over time to prevent film sag and loss of goods from the pallet, good cling to hold the film to itself, good optical properties to view the palletized goods through the stretched film (low haze), and good puncture and tear resistance to resist failure on irregularly shaped or sharped-edged loads.

These stretch wrap films are commonly manufactured by blown film and cast film processes. The films are often monolayer films comprising linear low density polyethylene, but can also be coextruded film structures having different layers.

Coextruded multilayer films are also made which have specific film layers to do specific jobs (e.g., one layer provides cling while another provides stretchability). For example, U.S. Pat. No. 5,019,315 (Wilson), incorporated herein by reference, discloses a coextruded stretch film with two outer layers of LLDPE and a core layer of branched high pressure-type low density polyethylene (LDPE). Other additives are said to be included to help impart tack or cling to the film. Conversely, U.S. Pat. No. 4,339,180 (Briggs et al.) and U.S. Pat. No. 4,418,114 (Briggs et al.), both incorporated herein by reference, describe coextruded stretch wrap films having a core layer of LLDPE and a skin layer of LDPE.

Yet another type of cling wrap film is disclosed in U.S. Pat. No. 4,367,256 (Biel), incorporated herein by reference, where a blend of LDPE and a minor amount of LLDPE is used to make the film. Still another type of cling wrap film is disclosed in U.S. Pat. No. 4,518,654 (Eichbauer et al.), incorporated herein by reference, where an A/B stretch wrap film structure has one sided cling. The cling is imparted by using a specific cling additive, such as PIB to one layer of the structure.

While there have been various solutions to specific stretch wrap film problems, films having an overall balance of properties, including superior stretch and load retention, along with good tear resistance, are still desired for commercial viability in the marketplace.

SUMMARY OF THE INVENTION

Monolayer or multilayer film structures made from specific polymer blends have now been discovered which have this balanced set of properties making the structures suitable for use as stretch wrap film structures. The film structures have improved load retention and ultimate stretching capability, and adequate overall physical properties, such as tear resistance. The stretch wrap film structures comprise at least one layer of a polymer blend, wherein the polymer blend comprises:

(A) at least one linear polyethylene, and (B) at least one branched polymer selected from the group consisting of ethylene homopolymers and ethylene/vinyl actetate copolymers, wherein the linear polyethylene and the branched polymer in the polymer blend are in a ratio from about 5:1 to about 33:1, as a function of the molecular weight of the branched polymer used.

In another aspect, the invention is a method of improving the ultimate elongation and load retention of a unitized pallet of goods by extruding the polymer blends disclosed herein into at least one layer of a film structure and stretch wrapping the pallet with the formed film structure.

DETAILED DESCRIPTION OF THE INVENTION

Figure 1:
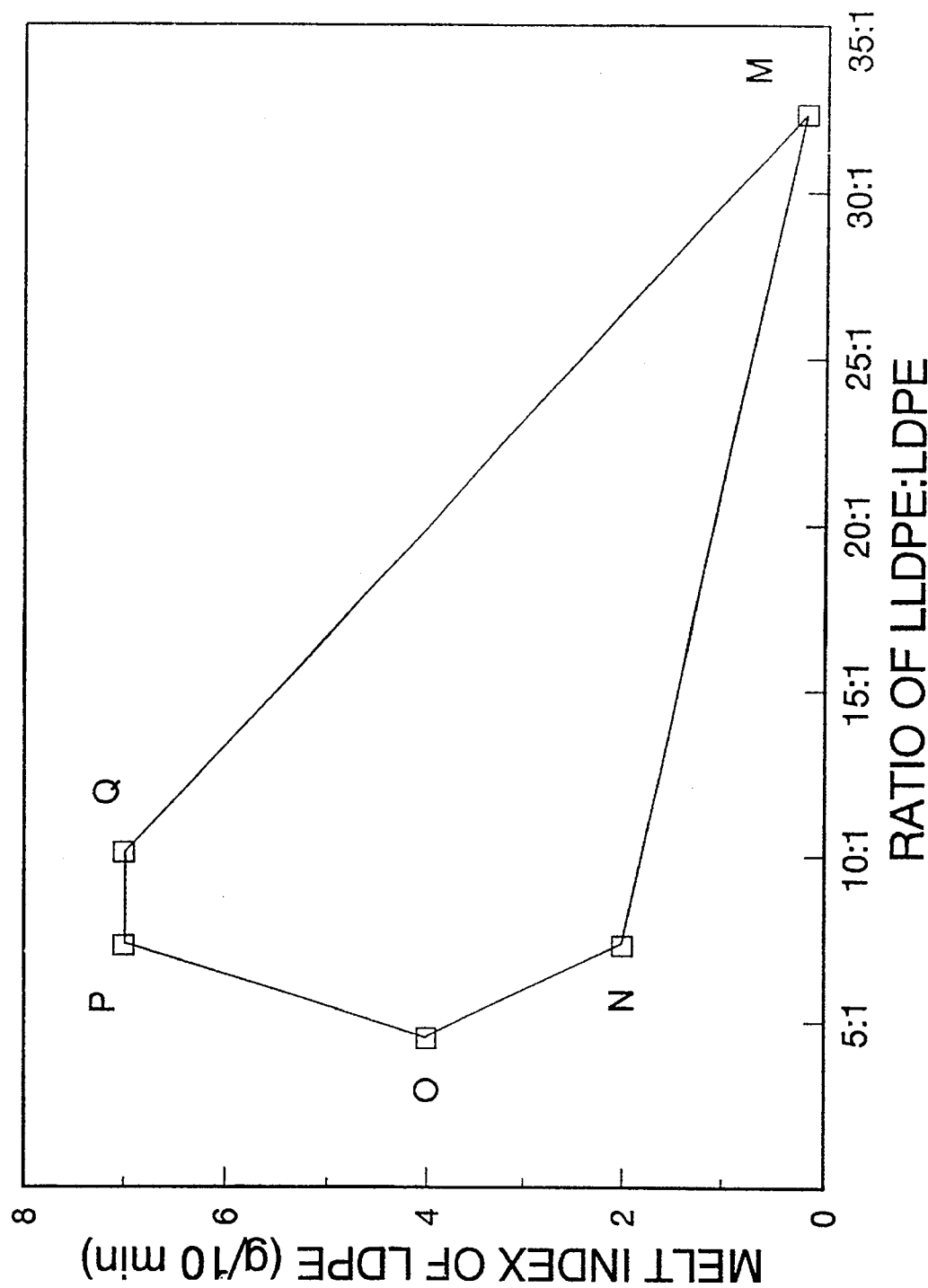
FIG. 1 graphically displays a range of blends of linear low density polyethylene and low density polyethylene compositions disclosed herein having properties suitable for use in stretch wrap film structures. The area of the graph defined and encircled by data points M, N, O, P and Q form a polygon and indicates those compositions having balanced properties as a function of melt index and percentage of the low density polyethylene.

There are several ways to manufacture both the LLDPE and the branched LDPE for use in this invention. For example, U.S. Pat. No. 4,076,698 (Anderson et al.), incorporated herein by reference, involves the use of coordination catalysts of the "Ziegler" or "Phillips" type and includes variations of the Ziegler type, such as the "Natta" type for making linear polyethylenes. These catalysts may be used at very high pressures, but may also (and generally are) used at very low or intermediate pressures and also include various high pressure or low pressure gas phase processes. Other manufacturing techniques are disclosed variously in U.S. Pat. No. 2,699,457; U.S. Pat. No. 2,846,425; U.S. Pat. No. 2,862,917; U.S. Pat. No. 2,905,645; U.S. Pat. No. 3,058,963; and U.S. Pat. No. 4,668,752. The disclosures of all of these U.S. Patents are incorporated herein by reference.

The products made by coordination catalysts are generally known as "linear" polyethylenes because of the substantial absence of branched chains of polymerized monomer units pendant from the main polymer "backbone." It is these linear polyethylenes to which the present invention primarily pertains. LLDPE and ultra linear low density polyethylene (ULDPE) (ULDPE is sometimes also known as very low density linear low density polyethylene, or VLDPE) typically have a density from about 0.87 grams/cubic centimeter (g/cm$^3$) to about 0.94 g/cm$^3$, while linear high density polyethylene (HDPE) has a density from about 0.941 g/cm$^3$ to about 0.965 g/cm$^3$ (i.e., ethylene homopolymer). The term "linear polyethylene" used herein means that the linear polyethylene can be either ULDPE or LLDPE, or mixtures of one or more of each of these.

The density of the linear polyethylene, as measured by ASTM D-792, is lowered by copolymerizing ethylene with minor amounts of at least one alpha-, beta-ethylenically unsaturated alkene(s) having from 3 to 18 carbons per alkene molecule (e.g., 1-propene, 1butene, 4-methyl-1-pentene, 1-hexene, 1-octene, 1,9-decadiene and 1,7-octadiene), preferably 4–8 carbon atoms (e.g., 1-butene, 4-methyl-1-pentene, 1-hexene and 1-octene) and most preferably 8 carbon atoms (i.e., 1-octene). The density of the linear polyethylene (or blend of linear polyethylenes) for use in the present invention is generally from about 0.9 g/cm$^3$ to about 0.93 g/cm$^3$, preferably from about 0.91 g/cm$^3$ to about 0.925 g/cm$^3$, and especially from about 0.91 g/cm$^3$ to about 0.922 g/cm$^3$.

The molecular weight of the linear polyethylene (or blend of linear polyethylenes) for use in the present invention is conveniently indicated using a melt index measurement according to ASTM D-1238, Condition 190° C./2.16 kg (formerly known as "Condition(E)" and also known as $I_2$). Melt index is inversely proportional to the molecular weight of the polymer. Thus, the higher the molecular weight, the lower the melt index, although the relationship is not linear. The melt index for the linear polyethylenes used herein is generally from about 0.5 grams/10 minutes (g/10 min) to about 10 g/10 min, preferably from about 0.7 g/10 min to about 5 g/10 min, and especially from about 2 g/10 min to about 4 g/10 min.

The high pressure branched LDPE, one of the branched polymers used herein, can also be made variously as disclosed in The Encyclopedia of Polymer Science and Engineering, Second Edition, Vol. 6, pp. 386–429 (John Wiley & Sons), incorporated herein by reference. High pressure LDPE is usually ethylene homopolymer and is made using a free radical initiator at elevated pressures, frequently from about 15,000 psi to about 50,000 psi at temperature up to about 300° C. in tubular or stirred reactors, causing numerous long chain branches to be formed along the "backbone" of the polymer. The density of the LDPE for use in the present invention is also measured according to ASTM D-792 and is generally from about 0.9 g/cm$^3$ to about 0.93 g/cm$^3$, preferably from about 0.915 g/cm3 to about 0.925 g/cm$^3$.

The molecular weight of the LDPE (or blends of LDPE) for use in the present invention is also indicated using a melt index measurement according to ASTM D-1238, Condition 190° C./2.16 kg ($I_2$). The melt index is generally from about 0.1 grams/10 minutes (g/10 min) to about 20 g/10 min, preferably from about 0.1 g/10 min to about 10 g/10 min and especially from about 0.5 g/10 min to about 8 g/10 min.

Another of the branched polymers useful herein is an ethylene-vinyl actetate copolymer. Ethylene-vinyl acetate copolymers (EVA) can also be made variously. For example, EVA can be made using a high pressure process similar to that used to make LDPE, i.e., a free radical polymerization reaction between ethylene and vinyl acetate. These polymerizations can be performed in conventional stirred autoclave or tubular reactors, and are usually conducted at high pressures (e.g., greater than about 20,000 psi) and at high temperatures (e.g., 200–320° C.). The molecular weight of the EVA copolymers is typically controlled by addition of chain terminators, e.g., propylene or isobutylene. The type and level of branching of EVA copolymers is similar to that observed in LDPE. Typically, from about 5 to about 50 weight percent (based on the total weight of the final EVA copolymer) vinyl actetate is copolymerized with ethylene. For use herein, the EVA copolymers have a vinyl acetate content from about 2 to about 9 percent, based on the total weight of the final EVA copolymer. The molecular weight of the EVA is also indicated by measuring melt index using ASTM D-1238 Condition 190° C./2.16 kg ($I_2$), as described for the LDPE. The melt index range for the EVA copolymers is the same as that described for the LDPE.

The amount of the branched polymer added to the linear polyethylene is a minor amount. The proportion of linear polyethylene:branched polymer in the polymer blend is dependent upon the molecular weight of the branched polymer, but is generally from about 5:1 to about 33:1, especially from about 7:1 to about 25:1. For a branched polymer having a melt index from about 0.1 to about 1 grams/10 minutes, the ratio of linear polyethylene:branched polymer in the polymer blend is from about 16:1 to about 33:1. For a branched polymer having a melt index of greater than about 1 gram/10 minutes to about 2 grams/10 minutes, the ratio of linear polyethylene:branched polymer is from about 7:1 to about 24:1, especially from about 7:1 to about 16:1. For a branched polymer having a melt index of greater than about 2 gram/10 minutes to about 20 grams/10 minutes, the ratio of linear polyethylene:branched polymer is from about 4.5:1 to about 16:1, especially from about 4.5:1 to about 7.5:1.

Additives such as antioxidants (e.g., Irgafos™ 168 (a phosphite) and Irganox™ 1010 (a hindered phenolic) both made by Ciba-Geigy Corporation), cling additives (e.g., polyisobutylene (PIB), ethylene vinyl acetate (EVA), amorphous polypropylene, polyterpene, sorbitan monooleate, glycerol monooleate, and microcrystalline wax), antiblock additives, pigments, and the like can also be included in the polymer blends, to the extent that they do not interfere with the enhanced film properties discovered by Applicants.

The polymer blends are formed by any convenient method, including dry blending the individual components and subsequently melt mixing, either directly in the extruder used to make the film, or by pre-melt mixing in separate extruder before making the film. The polymer blends may also be prepared by dual polymerization techniques, or by melt conveying the desired amount of LDPE directly into a molten stream of LLDPE from a polymerization reactor, prior to pelletization of the polymer blend. The polymer blends can also be made by dry blending discrete polymers having the specified properties in appropriate weight ratios, as demonstrated herein.

The films formed from the polymer blends of LDPE and linear polyethylene are made using known film manufacturing techniques, such as blown film equipment or cast film equipment. Specific manufacturing techniques of blown film are discussed, for example, in *The Encyclopedia of Chemical Technology*, Kirk-Othmer, Third Edition, John Wiley & Sons, New York, 1981, Vol. 16, pp. 416–417 and Vol. 18, pp. 191–192, the disclosures of all of which are incorporated herein by reference. Specific cast film manufacturing techniques are discussed, for example, in *The Encyclopedia of Chemical Technology*, Kirk-Othmer, Third Edition, John Wiley & Sons, New York, 1981, Vol. 18, pp. 192–199, and in Modern Plastics Encyclopedia, mid-October 1988, Issue Vol. 65, Number 11, pp. 232–234, the disclosures of which are also incorporated herein by reference. No special consideration need be given to process the blends disclosed herein on conventional film forming equipment.

The films may be monolayer or multilayer films. However, for coextruded multilayer film structures (e.g., 3 layer film structures), the polymer blend described herein can be used as a core layer or as a skin layer of the structure. Generally, the polymer blend described herein comprises at least 60 percent of the total multilayer film structure. When the polymer blend disclosed herein is used as the core layer, preferably each skin layer can comprise a linear low density polyethylene having a density from about 0.9 g/cm³ to about 0.925 g/cm³ and a melt index from about 2 g/10 minutes to about 6 g/10 minutes.

The thickness of the films may vary, but is typically from about 0.3 to about 10 mils (7.6 to 254 micrometers). For the three layer film structures described herein, the film thickness is preferably from about 0.4 mils to about 2 mils, and especially from about 0.5 mils to about 1.2 mils.

Films comprising the LDPE/LLDPE polymer blends disclosed herein and having a thickness from about 0.5 mils to about 1.2 mils have a balanced set of properties. The film structures comprising the polymer blends disclosed herein preferably have an ultimate elongation of at least 20 percent (absolute) higher than the ultimate elongation obtained using the LLDPE alone in the same film structure. The balanced set of properties is also indicated by a load retention of greater than or equal to about 108 percent of that obtained using the LLDPE alone in the same film structure; and a tear strength of at least 50 percent of that obtained using the LLDPE alone in the same film structure, when tested in the same batch of samples.

EXAMPLES

The polymers listed in Table 1 are used to make coextruded A/B/A three layer film structures on a cast film line. The percentage of each layer (based on the total thickness of the structure) is 10 percent/80 percent/10 percent. For these examples, the film thickness is about 20 micrometers; thus each A layer is about 2 micrometers thick and the B layer is about 16 micrometers thick. The core polymer (or polymer blend) and the skin polymer is varied in these examples and the coextruded film structures are each tested for ultimate elongation, load force, and machine direction tear.

TABLE 1

| Polymer | Description | $I_2$ (g/10 min) | Density (g/cm³) |
|---|---|---|---|
| I | ethylene/1-octene LLDPE | 2.3 | 0.917 |
| II | ethylene/1-octene LLDPE | 3.3 | 0.916 |
| III | ethylene/vinyl acetate copolymer | 2.9 | 6 percent vinyl acetate |
| IV | LDPE | 0.21 | 0.92 |
| V | LDPE | 1.77 | 0.924 |
| VI | LDPE | 7.13 | 0.919 |
| VII | LDPE | 1.89 | 0.923 |
| VIII | LDPE | 0.7 | 0.923 |
| IX | LDPE | 1.81 | 0.922 |
| X | LDPE | 4.2 | 0.924 |

Various 3-layer coextruded film structures are prepared using a cast film line.

The polymer blends are made by dry blending pellets of the specific polymers and feeding the dry blend into the appropriate extruder according to the weight ratios specified in Tables 2 and 7–13. The polymer blends described in each table are converted into film and tested separately from those described in the other tables, to ensure that a recent film sample from the same batch is fairly tested as a comparative. Data obtained from testing the film samples does not vary appreciably throughout a batch of film samples, but does vary somewhat from one testing batch to another, due to load cell changes/calibrations on the pallet testing device. Consequently, the data is evaluated within a given batch of film samples to ensure meaningful results.

The resultant multilayer film structures are tested for various physical properties using the following procedures:

Tear properties are measured using an Elmendorf tear tester according to ASTM D-1922.

Ultimate elongation and load force are measured using a Lantech SHS Film Test Stretch Wrapper. Ultimate elongation is the extent to which a stretch film will elongate prior to failure during the stretch wrapping process. This failure occurs between the rollers of a power pre-stretch unit. The ultimate elongation is measured by increasing the percent prestretch until the film fails between the two prestretch rollers. The percent prestretch at failure is referred to as the ultimate elongation. During this measurement, the force to load (F2) is preset to 10 pounds and the turntable rotates at a constant 9 rpm.

Load retention, or load force, reflects the ability of a stretch film to maintain a load of goods during storage or shipment. In this test, load retention is the force exerted by three wraps of film onto a load cell mounted on the face of an angle iron frame (which simulates a loaded pallet). For some of these tests, the stretch wrapper is set to obtain a 200 percent prestretch and 250 percent on-pallet elongation (designated as Load Force 200/250 (in pounds)). This test conforms to ASTM D-4649 A1.2.

TABLE 2

| Ex. | Core | LLDPE:branched polymer ratio | Branched polymer melt index (g/10 min) | Skin |
|---|---|---|---|---|
| 1* | 100% Polymer I | NA | NA | 100% Polymer II |
| 2* | 100% Polymer I | NA | NA | 100% Polymer III |
| 3 | 94% Polymer I 6% Polymer IV | 15.7:1 | 0.21 | 100% Polymer II |
| 4* | 91% Polymer I 9% Polymer IV | 10.1:1 | 0.21 | 100% Polymer II |

*Comparative Example Only
NA = Not Applicable

TABLE 3

| Ex. | Ult. Elong. (%) | Load Force 200/250 (lbs) | MD Tear (grams) |
|---|---|---|---|
| 1** | 325 | 38 | 275 |
| 2** | 350 | 46 | 200 |
| 3 | 400 | 46 | 245 |
| 4** | 425 | 50 | 110 |

**Comparative Example Only

Comparing Example 3 with Comparative Example 1, coextruded film made using a polymer blend of LDPE and LLDPE has a better balance of properties than a coextruded film made using the same LLDPE polymer alone as the core layer. The ultimate elongation is improved at least about 75% (absolute) for example 3, as compared with Comparative Example 1, while the load force is at least about 21% higher than, and the tear resistance is at least about 89% of comparative example 1. Comparative Example 4, a blend of LLDPE and LDPE in a ratio of about 10.1:1, has low tear strength and thus is not an example of the invention.

For Tables 7–11, three layer film structures are prepared as described in the fabrication conditions outlined in Tables 4–6 below:

TABLE 4

Extruder 1 (skin)

| Zone | Temperature (°F.) |
|---|---|
| 1 | 350 |
| 2 | 450 |
| 3 | 504–505 |
| 4 | 505–506 |

TABLE 5

Extruder 2 (core)

| Zone | Temperature (°F.) |
|---|---|
| 1 | 350–352 |
| 2 | 424–426 |

TABLE 5-continued

Extruder 2 (core)

| Zone | Temperature (°F.) |
|---|---|
| 3 | 482–486 |
| 4 | 484–486 |
| 5 | 484–485 |
| 6 | 484–486 |
| 7 | 485–486 |

TABLE 6

Extruder 3 (skin)

| Zone | Temperature (°F.) |
|---|---|
| 1 | 349–350 |
| 2 | 424–426 |
| 3 | 520–521 |
| 4 | 520–521 |

Extruder 1 is a 2.5 inch diameter extruder; extruder 2 is a 3.5 inch diameter extruder; and extruder 3 is a 2 inch diameter extruder. Melt temperatures, extruder rpm and back pressure varies according to the polymer blend used to make the film structure and is easily determined and suitably varied by observing the stability of the extrusion melt.

For these experiments, the die temperature is held at about 525° F., the die width is about 30 inches, and the die gap is about 20 mils. The chill roll temperature is about 70° F. The line speed is about 800 feet/minute at a throughput of about 385 lbs/hour. The film gauge is about 0.8 mils and the film is trimmed to about 18 inches for these tests.

TABLE 7*

Branched polymer melt index of 0.21 g/10 min

| Ex. | Core | LLDPE:branched polymer ratio | Ult. Elong. (%) | Load Force 200/250 (lbs) | MD Tear (gms) |
|---|---|---|---|---|---|
| 5 | 97% Polymer I 3% Polymer IV | 32.3:1 | 320 | 42 | 175 |
| 6** | 91% Polymer I 9% Polymer IV | 10.1:1 | 345 | 50 | 87 |
| 7** | 100% Polymer I | NA | 285 | 38 | 318 |

*The skin for these film structures is 100% Polymer I
**Comparative example only
NA = Not Applicable Comparing example 5 with comparative example 7**, the load force is higher by about 10%, while improving ultimate elongation by about 35% (absolute) and maintaining good tear resistance (about of the tear resistance of comparative example 1).

TABLE 8*

| | | Branched polymer melt index of 0.7 g/10 min | | | |
|---|---|---|---|---|---|
| Ex. | Core | LLDPE:branched polymer ratio | Ult. Elong. (%) | Load Force 200/250 (lbs) | MD Tear (gms) |
| 8 | 94% Polymer I 6% Polymer VIII | 15.7:1 | 285 | 45 | 244 |
| 9** | 88% Polymer I 12% Polymer VIII | 7.3:1 | 320 | 49 | 98 |
| 10** | 100% Polymer I | NA | 260 | 37 | 275 |

*The skin for these film structures is 100% Polymer I
**Comparative example only
NA = Not Applicable Comparing example 8 with comparative example 10**, the load force is higher by about 22%, while increasing ultimate elongation by about 25% (absolute) and maintaining tear resistance (about 89% of the tear resistance of comparative example 1).

TABLE 9*

| | | Branched polymer melt index of about 2 g/10 min | | | |
|---|---|---|---|---|---|
| Ex. | Core | LLDPE:branched polymer ratio | Ult. Elong. (%) | Load Force 200/250 (lbs) | MD Tear (gms) |
| 7** | 100% Polymer I | NA | 285 | 38 | 318 |
| 11** | 97% Polymer I 3% Polymer VII | 32.3:1 | 300 | 40 | 238 |
| 12 | 94% Polymer I 6% Polymer V | 15.7:1 | 320 | 43 | 212 |
| 13 | 94% Polymer I 6% Polymer IX | 15.7:1 | 320 | 42 | 195 |

*The skin for these film structures is 100% Polymer I
Comparative example only Comparing examples 12 and 13 with comparative example 7, the load force is higher by at least about 10%, while ultimate elongation is increased by about 35% (absolute) and tear resistance is maintained (at least about 61% of the tear resistance of comparative example 1 ).

TABLE 10*

| | | Branched polymer melt index of about 2 g/10 min | | | |
|---|---|---|---|---|---|
| Ex. | Core | LLDPE:branched polymer ratio | Ult. Elong. (%) | Load Force 200/250 (lbs) | MD Tear (gms) |
| 10** | 100% Polymer I | NA | 260 | 37 | 275 |
| 14 | 88% Polymer I 12% Polymer V | 7.3:1 | 290 | 41 | 151 |
| 15** | 82% Polymer I 18% Polymer V | 4.6:1 | 345 | 51 | 66 |

*The skin for these film structures is 100% Polymer I
**Comparative example only
NA = Not Applicable Comparing examples 14 with comparative example 10, the load force is higher by at least about 11%, while ultimate elongation is increased by about 30% (absolute) and tear resistance is maintained (at least about 55% of the tear resistance of comparative example 10).

TABLE 11*

Branched polymer melt index of about 4 g/10 min

| Ex. | Core | LLDPE:branched polymer ratio | Ult. Elong. (%) | Load Force 200/250 (lbs) | MD Tear (gms) |
|---|---|---|---|---|---|
| 10** | 100% Polymer I | NA | 260 | 37 | 275 |
| 16** | 97% Polymer I 3% Polymer X | 32.3:1 | 265 | 39 | 266 |
| 17 | 94% Polymer I 6% Polymer X | 15.7:1 | 280 | 40 | 214 |
| 18 | 88% Polymer I 12% Polymer X | 7.3:1 | 315 | 42 | 167 |
| 19 | 82% Polymer I 18% Polymer X | 4.5:1 | 320 | 43 | 144 |
| 20** | 76% Polymer I 24% Polymer X | 3.2:1 | 365 | 60 | 108 |

*The skin for these film structures is 100% Polymer I
Comparative example only Comparing examples 18 and 19 with comparative example 10, the load force is higher by at least about 13%, and ultimate elongation is higher by about 55% (absolute). Tear resistance is maintained at least about 52% of the tear resistance of comparative example 10**.

TABLE 12*

Branched polymer melt index of about 7 g/10 min

| Ex. | Core | LLDPE:branched polymer ratio | Ult. Elong. (%) | Load Force 200/250 (lbs) | MD Tear (gms) |
|---|---|---|---|---|---|
| 7** | 100% Polymer I | NA | 285 | 38 | 318 |
| 21** | 97% Polymer I 3% Polymer VI | 32.3:1 | 285 | 38 | 254 |
| 22 | 94% Polymer I 6% Polymer VI | 15.7:1 | 305 | 41 | 170 |
| 23 | 91% Polymer I 9% Polymer VI | 10.1:1 | 310 | 43 | 208 |

*The skin for these film structures is 100% Polymer I
Comparative example only Comparing examples 22 and 23 with comparative example 7, the load force is higher by at least about 8%, while maintaining good ultimate elongation (at least about 20% higher absolute elongation than comparative example 7) and tear resistance (at least about 53% of the tear resistance of comparative example 7).

TABLE 13*

Branched polymer melt index of about 7 g/10 min

| Ex. | Core | LLDPE:branched polymer ratio | Ult. Elong. (%) | Load Force 200/250 (lbs) | MD Tear (gms) |
|---|---|---|---|---|---|
| 10** | 100% Polymer I | NA | 260 | 37 | 275 |
| 24 | 88% Polymer I 12% Polymer VI | 7.3:1 | 290 | 44 | 214 |
| 25** | 82% Polymer I 18% Polymer VI | 4.6:1 | 300 | 47 | 95 |
| 26** | 76% Polymer I 24% Polymer VI | 3.2:1 | 305 | 50 | 32 |

*The skin for these film structures is 100% Polymer I
**Comparative example only
NA = Not Applicable Comparing example 24 with comparative example 10, the load force is higher by at least about 18%, while having better ultimate elongation (30% higher absolute elongation) and adequate tear resistance (at least about 78% of the tear resistance of comparative example 10). Example 24 also has a better balance of physical properties than does comparative examples 25 and 26, notably a higher tear strength.

FIG. 1 shows preferred compositions comprising low density polyethylene and linear low density polyethylene disclosed herein which, when formed into film structures as described herein, have a good balance of physical properties. The compositions fall within the area of polygon MNOPQ bounded by the points M (32, 0.02), N (7.3, 2), O (4.5, 4), P (7.3, 7), and Q (10.1, 7) in FIG. 1 and includes compositions described on the lines represented by this polygon (i.e., lines MN, NO, OP, PQ and QM).

TABLE 14*

Branched polymer is Polymer III; ethylene/vinyl acetate copolymer

| Ex. | Core | LLDPE:branched polymer ratio | Ult. Elong. (%) | Load Force 200/200 (lbs) |
|---|---|---|---|---|
| 25 | 85% Polymer I 15% Polymer III | 5.7:1 | 375 | 24 |
| 1** | 100% Polymer I | NA | 350 | 21 |

*The skin for these film structures is 100% Polymer II
NA = Not Applicable

Comparing example 25 with comparative example 1, the ultimate elongation is about 25% (absolute) higher than the ultimate elongation of Comparative example 1 and the load force is higher by at least about 14%.

What is claimed is:

1. A method of making a unitized pallet of goods, comprising the steps of:
   (A) providing a polymer blend which comprises
      (i) at least one linear polyethylene, and
      (ii) at least one branched polymer selected from the group consisting of ethylene homopolymers and ethylene/vinyl acetate copolymers, wherein the linear polyethylene and branched polymer are in a ratio from about 5:1 to about 33:1,
   (B) extruding the polymer blend to form a film structure,
   (C) stretch wrapping the pallet of goods with the film structure of (B).

2. The method of claim 1 further comprising the step of cast extruding the polymer blend.

3. The method of claim 1 wherein the branched polymer is at least one low density polyethylene.

4. The method of claim 1 wherein the branched polymer is at least one ethylene/vinyl acetate copolymer.

5. The method of claim 3 further comprising the step of dry blending the low density polyethylene with the linear low density polyethylene before extrusion.

6. The method of claim 1, wherein the film structure is a multilayer film structure.

7. The method of claim 6, wherein the multilayer film structure is formed in step (B) by a coextrusion technique.

8. The method of claim 7, wherein the coextrusion technique is cast coextrusion.

9. The method of claim 6, wherein the multilayer film structure is a three-layer film structure having at least one skin layer and at least one core layer.

10. The method of claim 9, wherein the at least one core layer is comprised of the polymer blend.

11. The method of claim 9, wherein the at least one skin layer is comprise of the polymer blend.

12. A method of making a film structure useful for stretch wrapping goods or unitizing a pallet of goods comprising the steps of:
   (A) providing a polymer blend which comprises
      (i) at least one linear polyethylene, and
      (ii) at least one branched polymer selected from the group consisting of ethylene homopolymers and ethylene/vinyl acetate copolymers, wherein the linear polyethylene and branched polymer are in a ratio from about 5:1 to about 33:1,
   (B) extruding the polymer blend to form a film structure.

* * * * *